(No Model.)

A. M. ENGLISH.
GLOVE FASTENER.

No. 412,372.   Patented Oct. 8, 1889.

Witnesses
Albert E. Leach
M. Hughes Thompson

Inventor
Analdo M. English
By his Attorney

UNITED STATES PATENT OFFICE.

ANALDO M. ENGLISH, OF BOSTON, MASSACHUSETTS, ASSIGNOR TO THE INTERNATIONAL FASTENING COMPANY, OF PORTLAND, MAINE.

GLOVE-FASTENER.

SPECIFICATION forming part of Letters Patent No. 412,372, dated October 8, 1889.

Application filed November 3, 1888. Serial No. 289,879. (No model.)

*To all whom it may concern:*

Be it known that I, ANALDO M. ENGLISH, a citizen of the United States, residing at Boston, in the county of Suffolk and Commonwealth of Massachusetts, have invented certain new and useful Improvements in Glove-Fasteners, of which the following is a specification.

Figure 1:
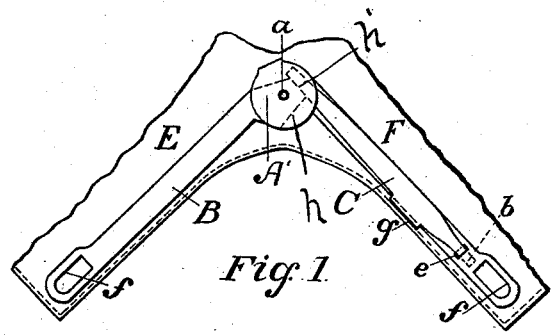
Figure 2:
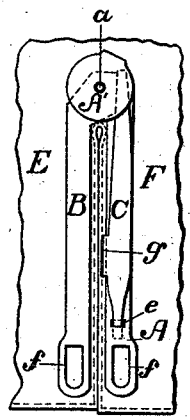
Figure 4:
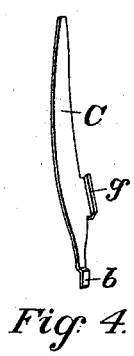
Figure 3:
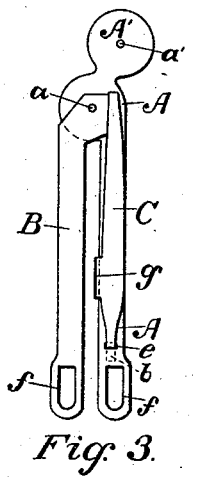
Figure 5:
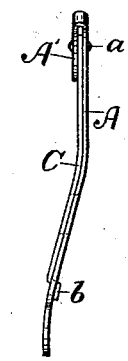

Of the accompanying drawings, Figure 1 shows the fastener as applied to a glove in an open position, looking from the inside. Fig. 2 is a similar view of the fastener in a closed position. Fig. 3 shows the parts of the fastener in place previous to clinching them together. Fig. 4 is a perspective view of the spring, and Fig. 5 is a side elevation of the fastener.

My invention consists of certain improvements, as hereinafter described, in that class of glove-fasteners in which two pivoted spring-arms are applied to the wrist-opening of the glove.

I preferably make my improved fastener in three pieces, A, B, and C, of any desired metal, the two arms A and B being pivoted together by the rivet $a$, as usual in fasteners of this class, the arm B being provided with square-shouldered portions $h\ h'$, against which the spring C bears when the fastener is in a closed and open position, respectively. The spring C is made in such a manner that it may be effectually held in place without riveting it to the arm A, but is secured partly by being locked or buckled to the said arm and partly by the aid of the single pivotal rivet $a$, which indirectly serves to retain in place the inner end of the spring, as will presently be described. The spring C is provided on one side with the struck-up edge $g$, to bear, buckle, or lock along the inner side of the arm A, and at its lower end the spring is bent as shown at $b$, whereby it may be buckled through the hole $e$ made in the arm A, and held in place in a manner easily understood by reference to Figs. 3, 4, and 5, without being riveted to the arm. When the three parts are thus placed together, the circular portion A', which is made, preferably, integral with the arm A, is bent down over the pieces B and C, or, if a separate piece, is placed against the same, and the rivet $a$ is passed through the parts A, B, and A', and headed therein, performing the double function of forming a pivot for the arms A and B and of fastening them together and retaining the inner end of the spring C in place, as shown in Figs. 3 and 5.

By buckling I mean securing the two parts together, not by riveting or otherwise permanently fastening them by any of the well-known methods now in use, but detachably joining them together by means of what might be called a "tongue," or struck-up projecting edge, on one part and a groove, slit, or hole in the other.

I desire to cover, broadly, the manner of attaching the spring C to the arm A by what I term "buckling" the two together, in place of riveting them directly, the buckling consisting in securing the spring to the arm by means of bracing edges or points on either part locking through holes in the other part; and to this end I do not confine myself to the exact forms of bracing-edges shown—as, for instance, I could obviously buckle the edge $g$ to the arm A in substantially the same manner that I have at the point $b$.

By the simple construction herein described glove-fasteners of this kind may be manufactured very easily and cheaply.

I am aware that spring-armed glove-fasteners have heretofore been in use, and such I do not broadly claim as my invention.

What I claim is—

1. A glove-fastener consisting of the arms A and B and a spring C, having the end $b$ and bracing-edge $g$, all joined together, substantially as described.

2. A glove-fastener consisting of two pivoted arms A B, one of which A is provided with a separate spring C, partially held between the arm A and the retaining portion A', riveted thereto, and partially by being buckled to said arm A, substantially as described.

In witness whereof I have hereunto set my hand.

ANALDO M. ENGLISH.

Witnesses:
   WM. B. H. DOWSE,
   ALBERT E. LEACH.